May 4, 1954   M. GIORGINI   2,677,467
TRAVELING TRAY-BELT FILTER
Filed Jan. 6, 1953   9 Sheets-Sheet 3

INVENTOR
Mario Giorgini
BY William Fox
ATTORNEY

May 4, 1954 M. GIORGINI 2,677,467
TRAVELING TRAY-BELT FILTER
Filed Jan. 6, 1953 9 Sheets-Sheet 7

INVENTOR
Mario Giorgini
BY William J Fox
ATTORNEY

May 4, 1954  M. GIORGINI  2,677,467
TRAVELING TRAY-BELT FILTER
Filed Jan. 6, 1953  9 Sheets-Sheet 8

INVENTOR
Mario Giorgini
BY William Fox
ATTORNEY

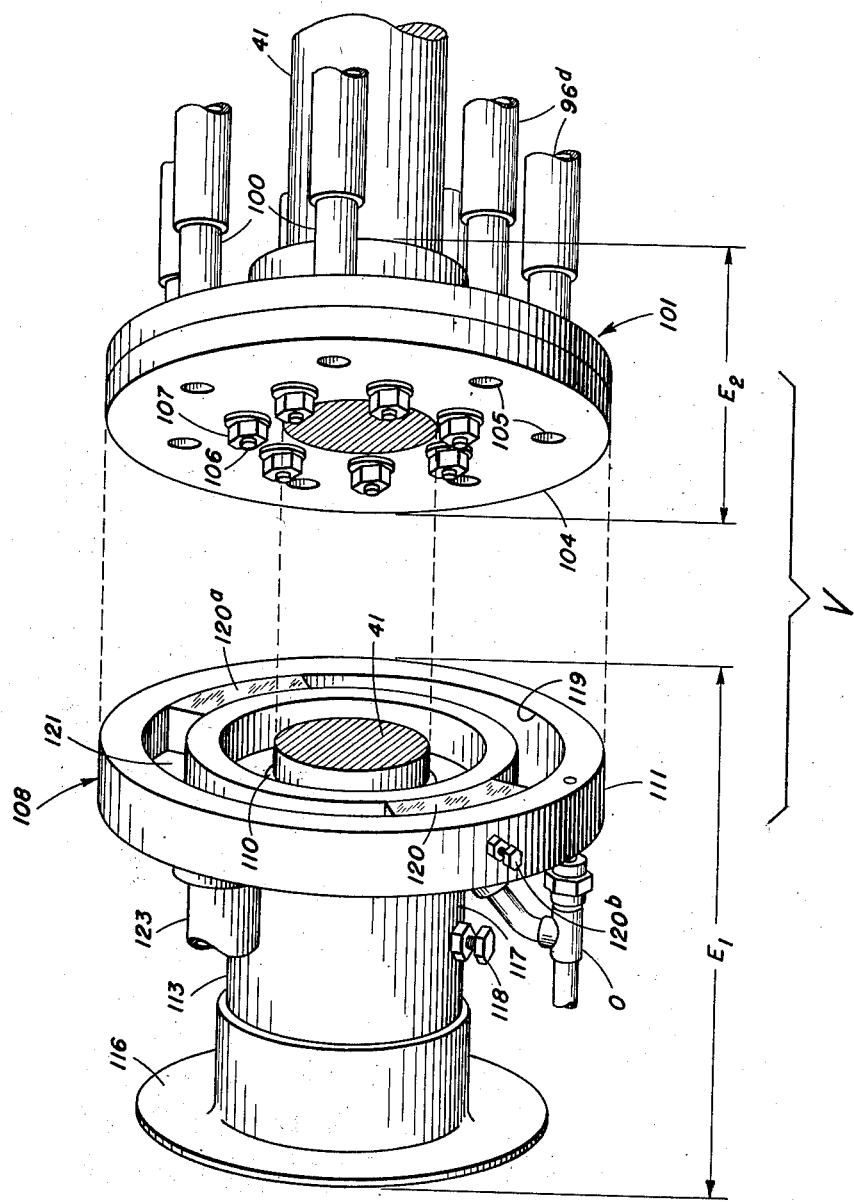

Patented May 4, 1954

2,677,467

UNITED STATES PATENT OFFICE 2,677,467

TRAVELING TRAY-BELT FILTER

Mario Giorgini, Milan, Italy, assignor to The Dorr Company, Stamford, Conn., a corporation of Delaware Application January 6, 1953, Serial No. 329,771

7 Claims. (Cl. 210—198)

This invention relates to improvements in traveling tray-belt filters herein briefly termed tray belt filters in which a series of trays or boxes to to receive the material to be filtered move in an endless path in a vertical plane, the path of travel comprising a horizontal upper portion where the trays having been given their charge of feed slurry travel through a filtration zone, a descending zone where the trays move from an upright towards an inverted position while discharging filter cake, a horizontal lower portion where the trays travel in inverted position to be subjected to washing of the filter media by upwardly directed washing sprays, and an ascending portion where the trays return from the inverted to the upright position and to the point of being charged with feed slurry to be filtered.

In such a type of filter unit, of which an example can be found in the U. S. patent to Nordengren No. 2,570,697, each tray has a perforated bottom over which a filter cloth or medium is stretched, and the effective height of the sides of the trays is such as to meet the particular requirements of filtration characteristics of the material to be filtered. These trays have wheels rolling on tracks provided upon the framework of the filter unit, and they are linked together to form a tray belt which is moved by driving sprockets engaging racks or lugs provided at the bottom of the trays. Thus, this chain or belt of trays is driven to move in a horizontally elongated endless path while material to be filtered is being supplied to the trays at the point where the succession of trays pass into the upper horizontal portion of the path. While traveling this horizontal distance the material in the trays is subjected to vacuum filtration since the bottoms of the trays are connected to an endless rubber suction belt having sliding contact with an elongated horizontal stationary suction box coextensive with the upper horizontal portion of the path, the belt having passages or openings to communicate with filtrate suction openings in the bottoms of the trays.

As the trays leaving the horizontal suction box pass on to and through the descending portion of the path, the residual material or filter cake is dumped from the trays into a discharge hopper, whence the trays travel inverted through the lower horizontal portion of the path back to the initial point of supply for refill of the trays. Wash water is supplied to the filter media of the trays while inverted, by means of a suitable arrangement of spray nozzles disposed underneath the inverted filter trays for sending upwardly directed sprays of wash water against the filter media of the trays. A hopper construction or catch pan extending horizontally underneath the inverted trays and underneath the spray nozzles is provided for collecting the spent water from the washing sprays.

Provisions can be made with regard to the suction box, such that, as the trays move upon and along the length of the suction box they pass first through the filtration zone proper, then through a filter cake washing zone, and finally through a cake dewatering or drying zone. That is to say, the length of the suction box is subdivided into successive lengths or sections kept under vacuum, which represent the filtration, the washing, and the drying zone respectively; that is, the filtration section of the suction box draws and receives the filtrate proper leaving filter cake upon the tray bottoms, the washing section of the suction box draws and receives spent wash liquid applied to the filter cake, while the drying section of the suction box serves to draw residual wash liquid from the filter cake so that the same may be disposed of or recovered in as dry a condition as possible.

Thus, by its horizontally longitudinal extent the tray belt type of filter unit is capable of providing a desired length of filtration zone as well as desired lengths of the washing and drying zones, thus, presenting an advantage not possessed by other filter types such as the rotary vacuum drum filters where the degree of immersion of the filter into the pulp determines the extent of the filtration zone and thereby governs and limits the extent of the washing and drying zones along the circumference of the drum.

One case in point for the use of the tray belt of filter is found in the manufacture of phosphoric acid where a pulp of comminuted phosphate rock digested by sulfuric acid is to be filtered, and where a problem lies in that the resulting phosphoric acid in the pulp be obtained as filtrate at relatively high or maximum concentration. At that concentration the phosphoric acid may be of relatively viscous consistency and may require not only a relatively large filtration zone, but also relatively large cake washing and cake drying zones.

However, a problem does arise with respect to effecting cake discharge at the descending end of the tray-carrying belt or chain, in that the tray-belt filter constructions as heretofore known rely upon gravity to have the cake drop off the filter cloth as the trays descend at the rear end of the filter unit to the inverted position, at which time residual matter may be left clinging to the filter media or the cake may even fail to discharge at all, in which event the burden of removing cake or residue falls upon the washing spray directed upwardly against the inverted trays, and the recovery of dry cake is reduced to that extent.

It is therefore one of the objects of this invention to improve present day tray-belt filter units by providing means for intensifying and expediting and rendering more positive and efficient the cake discharge, so that clinging of residual matter to the filter medium is minimized, and the subsequent external spray washing operation is rendered more efficient while being relieved at least of part of the burden of washing off and carrying away residual cake matter from the filter media to a place of disposal or sewer; and to attain this object without change in the overall structure or size or length of the filter unit as such.

Another problem arises when it is desired to remove from the spray-washed filter media and from the trays themselves residual wash water, so that dilution of the strong initial filtrate such as the phosphoric acid by such residual water may be avoided when the trays again pass into the filtration zone.

In the case of the strong phosphoric acid filtrate this means that the high degree of concentration of the phosphoric acid is maintainable in the first filtrate unimpaired by residual wash water in the filter media and in the trays.

It is therefore another object of this invention to embody in the structure of the tray-belt filter unit an auxiliary treatment zone or novel devices for removing residual wash water from the filter cloth and from the trays themselves by air blowback or by suction, without having to resort to increasing the length of the suction box or the structural length of the filter unit as a whole.

According to this invention these objects are attainable by providing a traveling tray belt filter type unit which has a front end sprocket construction and a rear end sprocket construction, such that the diameter of the sprocket wheels defines by their effective circumference the ascending and the descending arcuate portions of the endless path of travel of the trays.

An endless rubber suction belt is fastened to the tray bottoms to travel bodily with the chain of trays, which suction belt has suction openings registering directly with suction passages or ports provided in the tray bottoms. In addition, each of the sprockets has embodied therein a spider construction which is coaxial and unitary therewith, and provides timing means for controllably supplying to the hollow spider arms blow-back air in such a manner that air pressure automatically reaches the hollow spider arms during a portion of that phase of rotation thereof where the open ends or mouths of the spider arms will have closed upon and have pressure contact with the rubber belt in registry with the suction openings therein, which openings represent the communicating passages leading to the trays.

According to one feature the supply of air pressure or suction to the hollow spider arms is governed by a rotary valve construction which is concentric and coaxial with the axis of rotation of the spider structure, and which comprises a rotary member in which terminate the inner open ends of the hollow spider arms, and a stationary air pressure supply member in air tight pressure contact with the rotary member and effective to blank off the spider arms which move through an arc or phase where the outer ends or mouths of the spider arms are exposed to the atmosphere and out of contact with the trays, while providing an air supply chamber so dimensioned as to expose the inner ends of the hollow spider arms to the pressure air supplied to said chamber.

According to another feature, the outer ends of the hollow spider arms have resiliently yieldable mouth pieces for automatically establishing pressure contact between them and the rubber suction belt as they successively and repetitively engage the same.

According to still another feature the tray-belt comprises an endless chain the links of which are represented by the bottom portions of the trays themselves alternating with links connecting the bottoms with one another, and where the effective length of the connecting links is equal to that of the links represented by the tray bottoms. End sprockets engage the chain defining the arcuate ascending and descending portions of the endless path, with the sprocket teeth having a pitch equal to the pitch or effective length of the links.

While there is herein disclosed a hollow spider construction for each of the sprocket wheels, it is to be understood that only one or the other spider constructions may be embodied without deviating from the scope of the invention.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or of forms that are their functional as well as conjointly cooperative equivalents, are therefore intended to be embraced by those claims.

In the drawings:

Figure 11 is a greatly enlarged detail perspective view of the rotary air pressure control valve shown in Figure 6, with the stationary and the rotary section of the valve drawn apart and viewed in opposite perspective directions.

Figure 1:
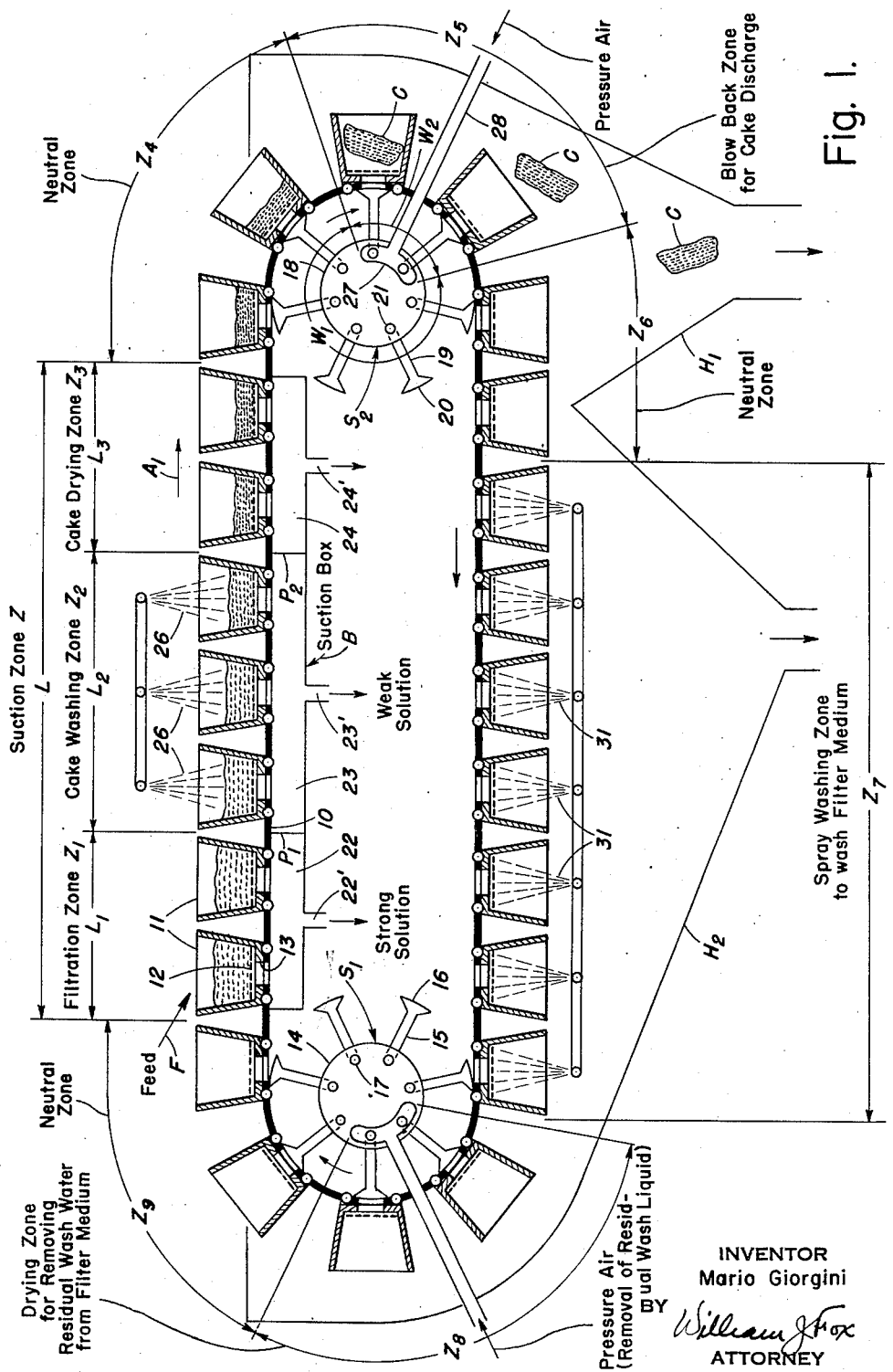
Figure 1 is a diagrammatic side view of the filter unit with the various operating zones indicated therein.

The tray-belt filter unit embodying this invention is diagrammatically shown in Figure 1 by way of presenting an endless suction belt 10 having attached thereto the filter trays 11, each of which trays has a filter medium 12 and a bottom opening 13 underneath the filter medium, to which either suction or pressure may be applied.

In this diagrammatic view the links whereby the trays 11 are in fact connected with one another to form an endless chain, are here coincidentally represented by the suction belt 10; whereas the front end and the rear end sprockets for this chain are here coincidentally represented by respective spider constructions $S_1$ and $S_2$, the significance of which according to this invention will be described in detail as this specification proceeds.

The spider construction $S_1$ comprises a hub portion 14 from which extend a set of hollow spider arms 15 each of which has an outer open end or mouth 16 and an inner open end 17. The spider construction $S_2$ comprises a hub portion 18 from which extend a set of hollow spider arms 19 each of which arms has an outer open end or mouth 20 and an inner opening 21. The spider arms of both these spider constructions $S_1$ and $S_2$ are so disposed that the outer ends or mouths thereof will register successively with corresponding bottom openings 13 of successive filter trays 11 incident to the rotation of the spider constructions $S_1$ and $S_2$ and to the concurrent movement of the chain.

As the spider constructions $S_1$ and $S_2$ (alias sprockets) rotate, the trays 11 move in the direction of arrows $A_1$ cyclically through a sequence of operating zones. That is to say, starting at the front or feed end of the filter unit, empty trays 11 ascending at that end are supplied with a feed slurry F such as a chemical solution mixed with solids, as they enter what is here indicated as the suction zone Z of the length L. This suction zone Z is in effect defined by the length of an elongated narrow suction box B longitudinally coextensive with the path of travel of the trays along the horizontal top portion of the filter unit. The suction Z is functionally subdivided into a filtration zone $Z_1$ proper of the length $L_1$, a filter cake washing zone $Z_2$ of the length $L_2$ and a filter cake drying zone $Z_3$ of the length $L_3$, such functional subdivision being effected due to the provision of transverse partitions $P_1$ and $P_2$ in the suction box B; accordingly because of these partitions the suction box B presents three sequential operating sections 22, 23, 24. The first operating section 22 has a suction connection 22' for drawing and receiving what is herein termed the original or strong filtrate solution from the trays 11 passing through the zone $Z_1$ while leaving in the trays a filter cake still containing a quantity of residual strong solution; the second operating section 23 of the suction box has a suction connection 23' for drawing and receiving spent wash water that is being applied to the filter cake in the trays by a set of washing sprays 26 provided for the trays passing through the washing zone $Z_2$, the spent wash water representing weak solution of the chemical washed from the cake; the third operating section 24 of the suction box has a suction connection 24' for drawing and receiving residual spent wash water from the filter cake in the trays passing through the drying zone $Z_3$, whereby there is left in the trays a washed and relatively dry filter cake.

From the suction zone Z the trays containing the washed and dried filter cake pass into and descend through a neutral zone $Z_4$ at the rear or discharged end of the filter unit where there is neither suction nor pressure exerted upon the contents of the trays. However, in passing through this neutral zone the tray bottoms make operating contact with the open ends or mouths 20 of the respective spider arms 19, whereby there is established operative pressure contact between the spider arms and the suction belt 10 with the mouths 20 being in registry with the tray bottom openings 13. Thus connected the trays descend further and pass through a back-blow and cake discharge zone $Z_5$ at which time the inner ends 21 of the hollow spider arms 19 make connection with a stationary air pressure supply chamber or sector 27, the air pressure supply thereto being indicated by a pipe 28.

With the descending trays thus gradually assuming a partly or semi-inverted position the air pressure or back blow acting from underneath the filter media causes the same to bulge and thus to loosen the filter cake to effect and expedite their discharge from the trays as is indicated by filter cake C dropping into a hopper $H_1$. The extent of the blow back zone $Z_4$ corresponding to the air pressure chamber 27 is such that the inner ends 21 of the hollow spider arms move out of contact with the air pressure chamber 27 somewhat before the respective trays reach their fully inverted position, that is prior to the point when the mouths 20 will disconnect themselves from the suction belt 10.

In fact, the rotary hub portion 18 of the spider structure $S_2$ containing the internal terminal ends or openings 21 of the spider arms constitutes with the stationary air pressure supply chamber 27 a rotary type of control valve which operates incident to the rotation of the spider structure $S_2$ to keep the inner terminal openings 21 blanked off and rendered inactive throughout that portion of their circular path during which they are functionally disconnected from the air pressure supply chamber 27. The structural implementation and function of this rotary control valve will be more fully described in the details further below.

From the cake discharge zone $Z_5$ the emptied trays travel in inverted position into and through a neutral zone $Z_6$, thence through a spray washing zone $Z_7$ where the filter media of the trays receive upwardly directed wash sprays 31 for removing solid particles of filter cake which may have adhered to the media after cake discharge. Leaving the spray washing zone $Z_7$ the trays move ascendingly into and through a second blow back zone at the front end of the filter unit for effecting the removal in an outward direction from the filter media and from the trays of residual spray wash water left from the treatment in the preceding zone, so that the trays may thereafter reenter the operating cycle in as dry a condition as possible, that is to say as free as possible of potential diluent liquid for the slurry F which is then once more fed to the trays as they reenter the filtration zone $Z_1$. The spent spray wash water from the sprays 31 is caught in a hopper $H_2$ whence it may discharge to a sewer or other place of disposal.

With the diagrammatic view of Figure 1 presenting the outline as to structure and operation of the machine, there will now be described the structural implementation of the filter unit according to the details shown in Figures 2–10.

Figure 2:
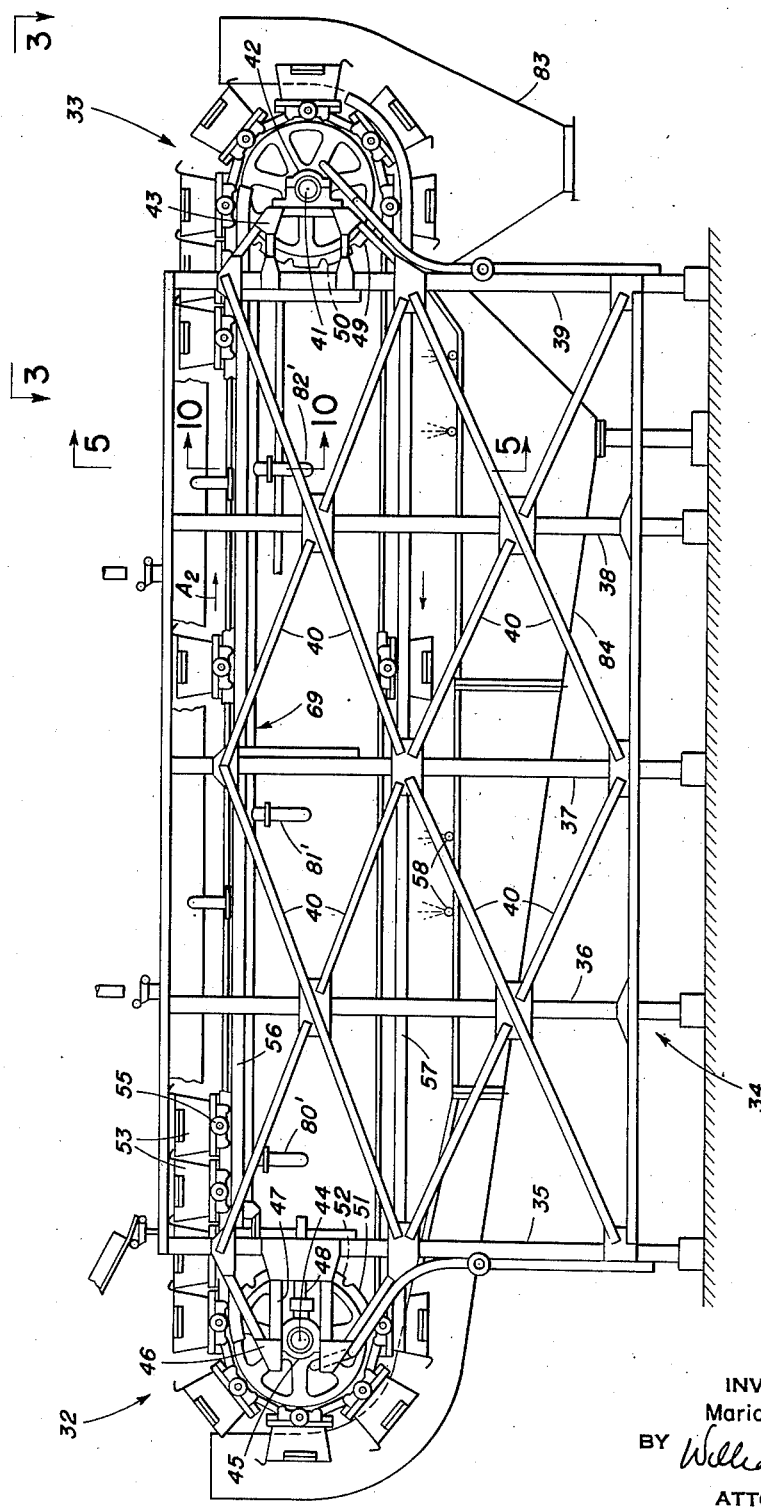
Figure 2 is a side view of the filter unit structurally more fully implemented.
Figure 3:
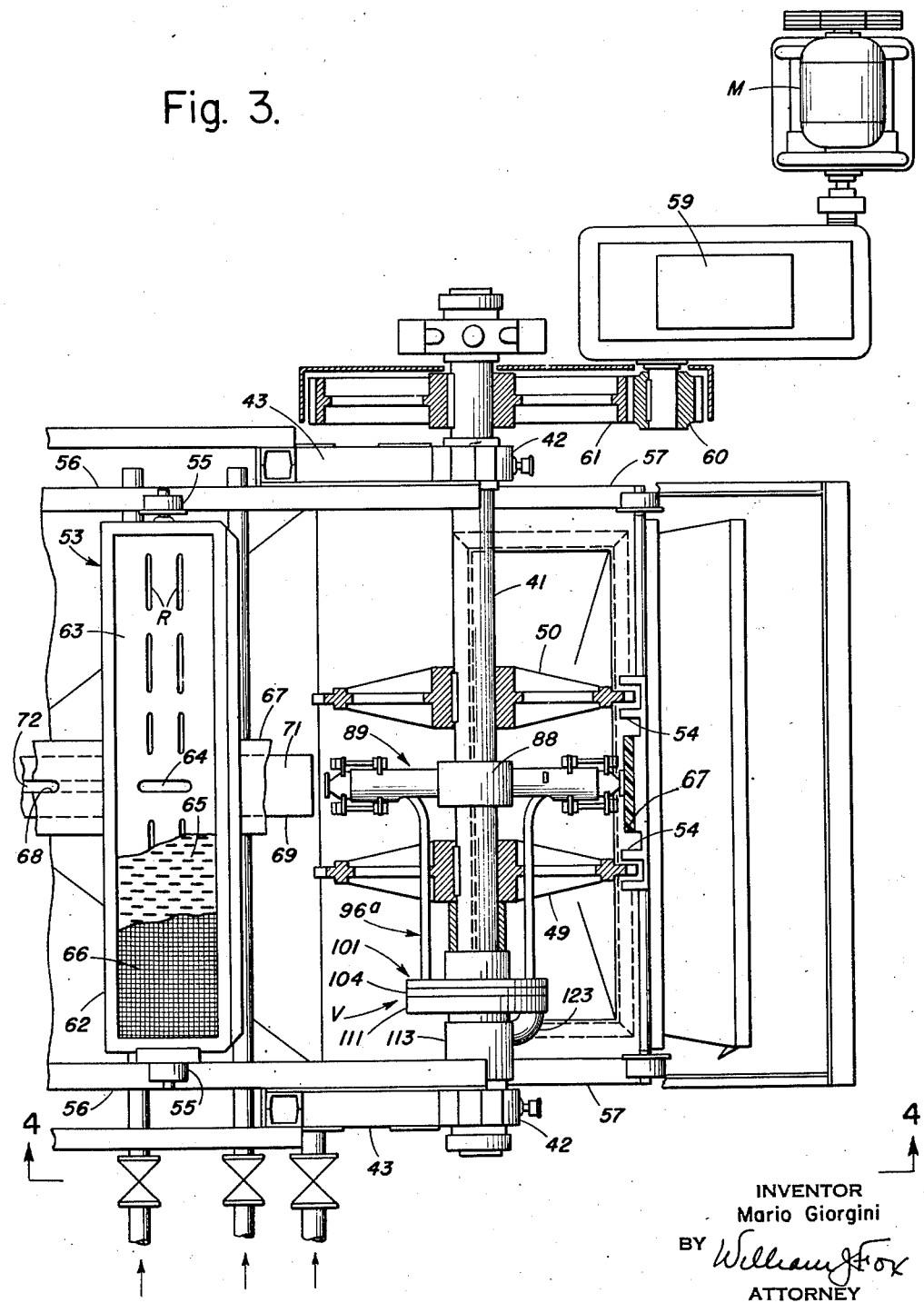
Figure 3 is a part sectional top view of the rear end (cake discharge zone) of the filter unit, taken on line 3—3 of Figure 2, whereby there is exposed a semi-diagrammatic view of the spider construction at that end of the filter.
Figure 4:
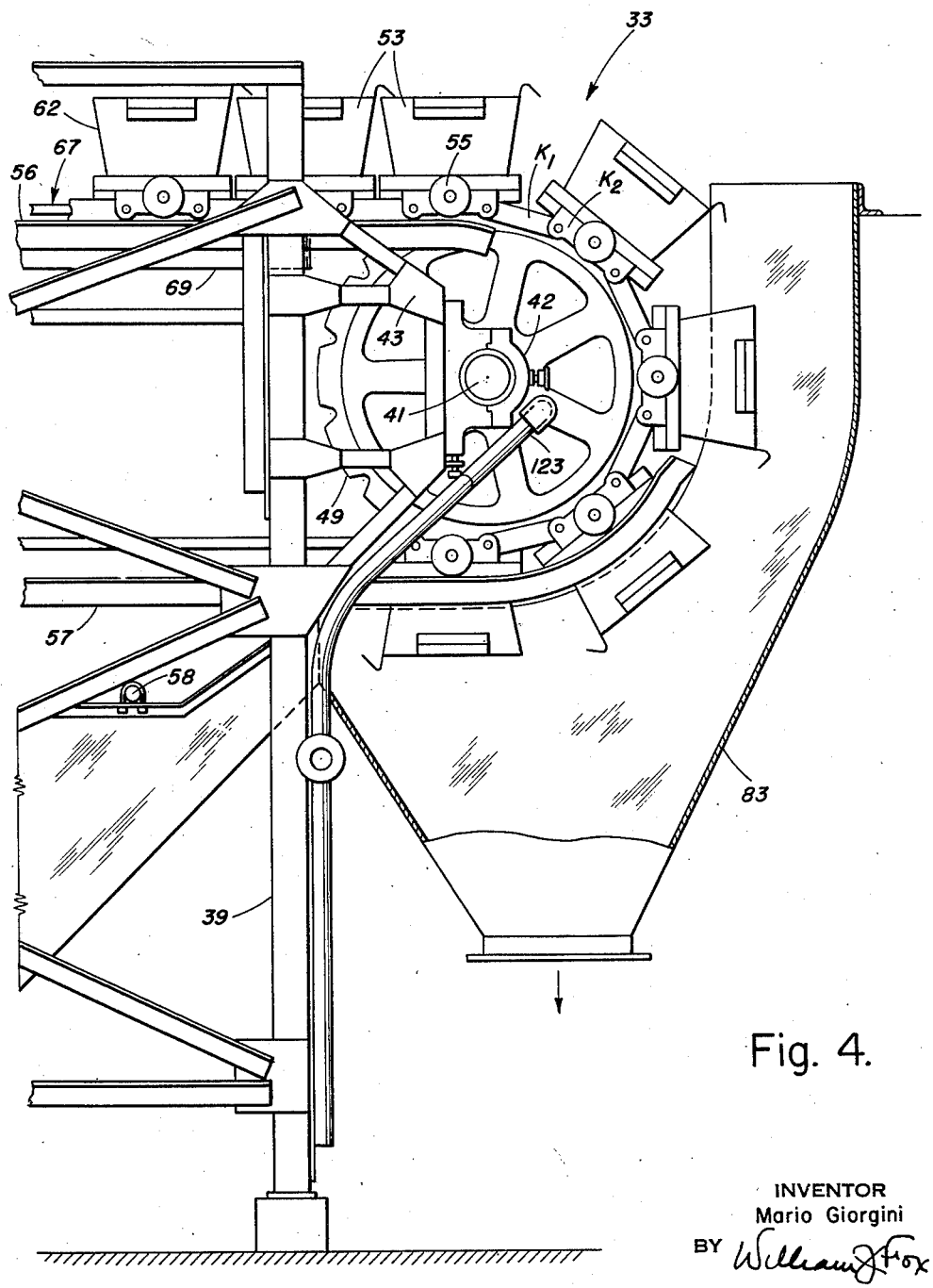
Figure 4 is a side view of the rear end portion of the filter unit, taken on line 4—4 of Figure 3.
Figure 5:
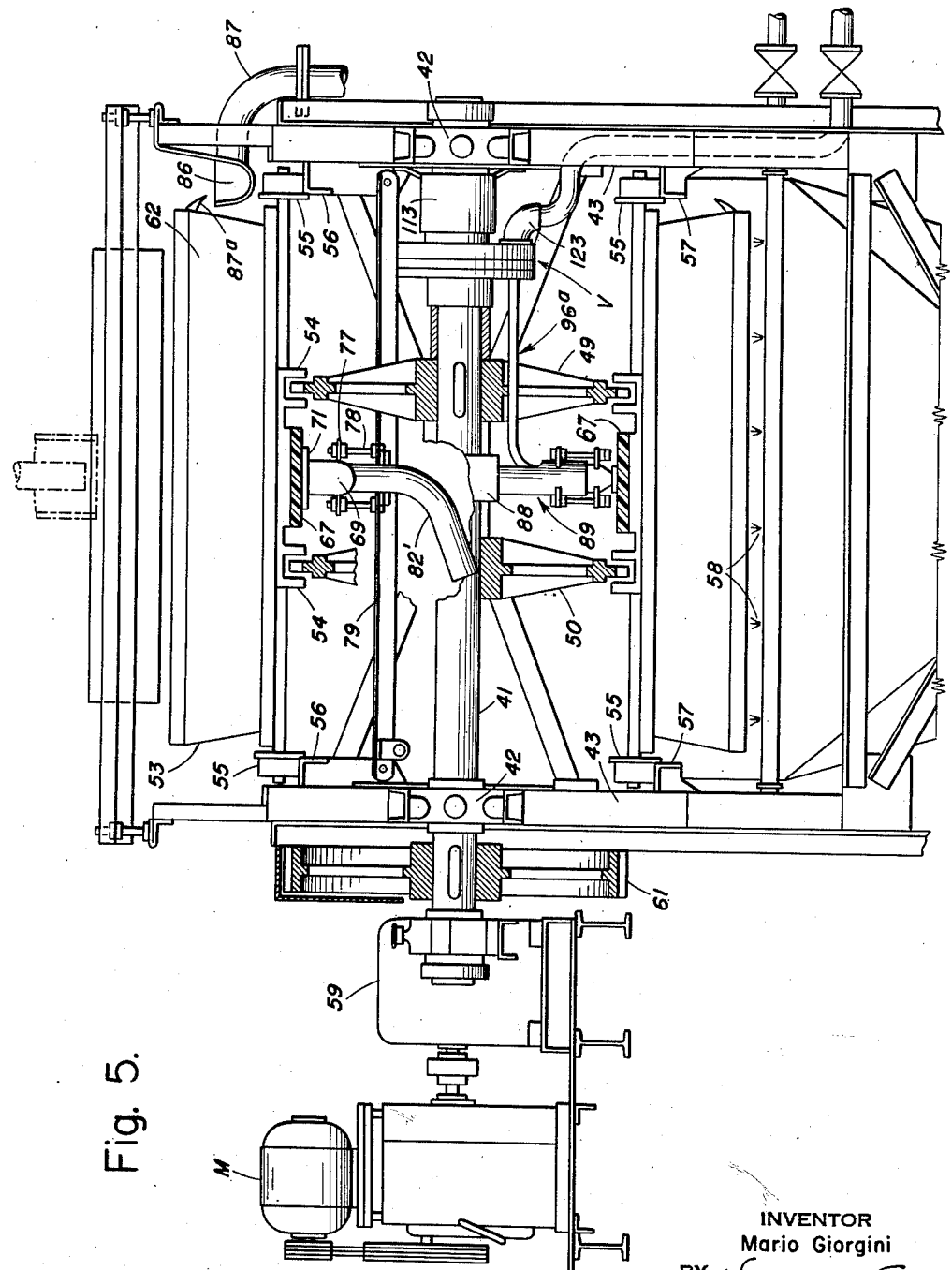
Figure 5 is a part sectional end view of the rear end portion of the filter unit taken substantially along line 5—5 of Figure 2.

This machine as it appears from the side view in Figure 2 has a front or feed end portion 32 and a rear or cake discharge end portion 33. The machine has a frame or structural steel structure 34 which in turn comprises a row of upright members or stanchions 35, 36, 37, 38 and 39 at each side of the machine, with diagonal bracing members 40 interconnecting the upright members of each lateral row thereof, and the structure also comprises suitable transverse bracing members (not visible) interconnecting the respective lateral rows of upright members. Each end of the frame structure carries a pair of horizontal bearings on which to support a horizontal sprocket shaft upon each end of the frame structure. That is to say, at the rear end of the machine a sprocket shaft 41 is carried in a pair of such bearings 42 (see also Figure 3) which bearings are mounted upon a corresponding pair of bracket structures 43 extending rearwardly from the rear end of the frame structure.

Similarly, another sprocket shaft 44 at the front end (feed end) of the machine is carried by a pair of bearings 45 which in turn are mounted upon a corresponding pair of bracket structures 46 extending in overhanging fashion forwardly from the front end of the frame structure. The bearings 45 are shown to be horizontally adjustable in a conventional manner as indicated by the horizontal guide tracks 47 and a horizontal adjusting spindle or screw 48.

The rear end sprocket shaft 41 carries a pair of identical sprockets 49 and 50 fixedly keyed to the shaft, while the front end sprocket shaft 44 similarly carries a pair of identical sprockets 51 and 52. An endless chain of filter trays 53 operates upon and is operated by the two sets of sprocket wheels, such chain comprising links represented by the trays themselves in alternation with links connecting the trays with one another; thus the chain in effect comprises links $K_1$ (i. e. filter trays) alternating with links $K_2$. The trays 53 have provided at the underside thereof racks or lugs 54 adapted to be engaged by the sprocket wheels to drive the chain as in the direction of arrow $A_2$. Each filter tray 53 has a pair of rollers 55 whereby the trays operate upon a pair of upper tracks 56 and a pair of lower tracks 57 provided upon the steel frame structure 34. That is, the trays travel in upright position upon and along the upper tracks during the filtration operation then to descend onto the lower tracks to be supported thereon in their inverted position while being subjected to washing of the filter media from below by means of upwardly directed wash spray 58. The chain of filter trays is driven (see Figures 3 and 5) from a motor M through power transmitting means shown to comprise a reduction gear unit 59, a pinion 60, and a large gear 61 fixed upon sprocket shaft 41.

Each filter tray as such comprises a tray or box body 62 having a bottom 63 provided with a somewhat elongated center opening 64 therein, the elongation of that opening being in the direction of travel of the tray. The tray bottom 63 is shown to be provided at the top side thereof with a set of spacing ribs R or the like upon which is supported a perforated plate 65 (partly broken away) serving as a backing plate for the filter medium or filter cloth 66 proper (also shown partly broken away).

An endless flat belt 67 of rubber or the like and herein termed the suction belt is fastened tightly as by studs and nuts 67a to the underside of all the trays 53 (see Figures 3 and 5) namely between each respective pair of lugs 54 at the underside of the tray bottoms, which suction belt has openings 68 registering with the openings 64 in the tray bottoms.

A narrow suction box 69 is disposed underneath and coextensive with the upper horizontal portion of the suction belt 67, such relationship between the suction belt and the associated suction box being more clearly shown in the details of the Figures 7, 8, 9, 10. Indeed, from Figures 7 and 10 it can be seen that the suction box consists of a narrow trough-like structure or trough 69 having welded thereto a cover plate 71 providing a narrow slot-like suction opening 72 extending substantially the entire length of the trough or suction box, with transverse strips or bridging portions 73 welded at intervals across the opening 72 at the under side of the cover plate 71; this cover plate in fact forms and provides outwardly over-hanging flange portions 74 and 75 along the length of the trough, which flange portions are shown to be reinforced as by ribs 76.

Furthermore, the trough of this suction box has welded outwardly thereto and at each side thereof a number of brackets 77 shown in the form of steel angles whereby it is fixedly supported as by means of stay bolts 78 upon transverse bracing members 79 of the steel structure 34. The mounting of the suction box 69 upon the frame structure and relative to the traveling suction belt 67 is such as to establish contact with the underside of the suction belt 67 to be of sufficient air tightness or closeness as the belt moves to provide effective suction from the suction box to the filter trays.

Figure 7:
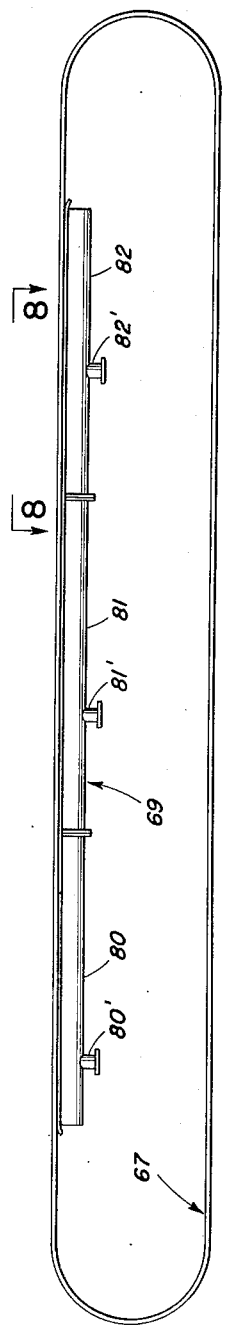
Figure 7 is a detail side view of the endless suction belt together with its suction box.
Figure 8:
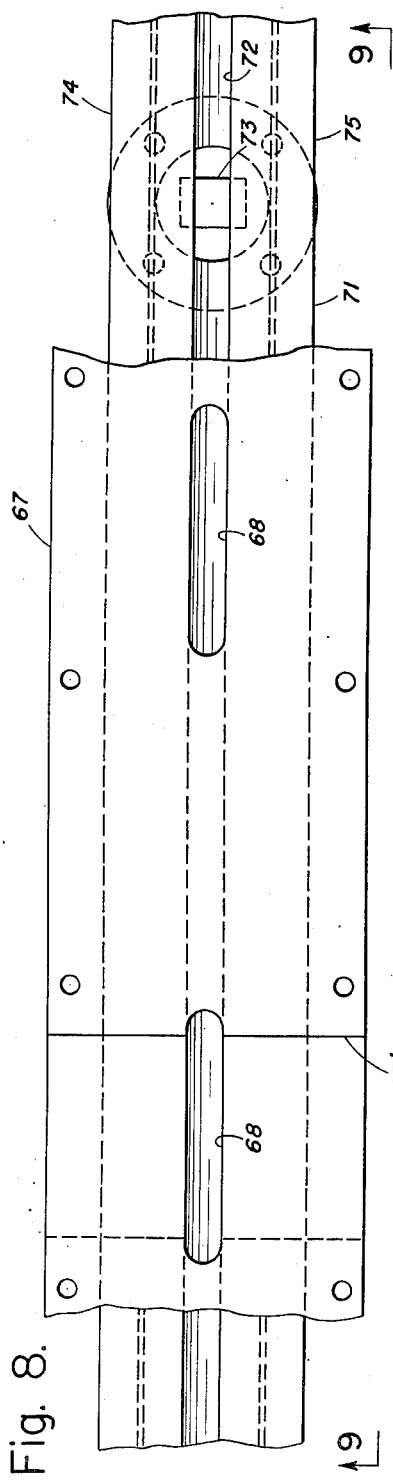
Figure 8 is an enlarged detail top view taken on line 8—8 of Figure 7.
Figure 9:
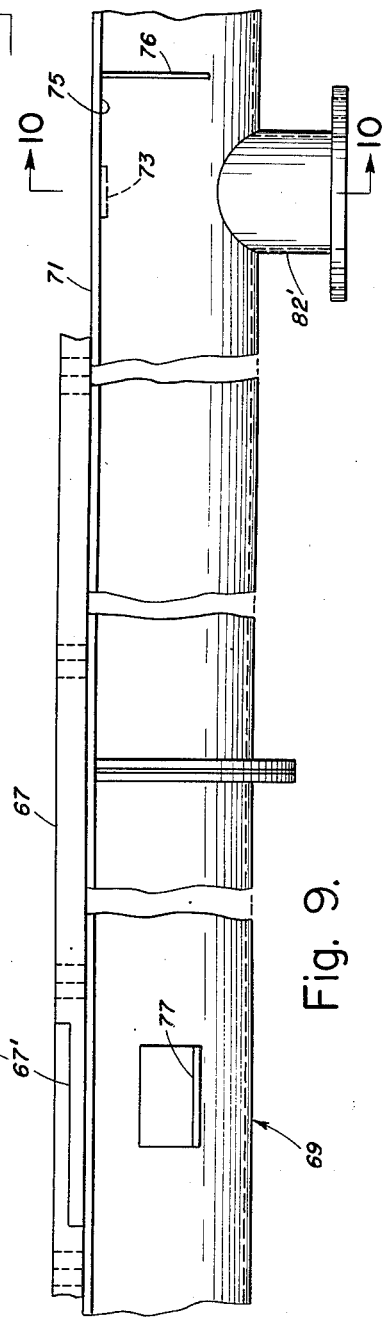
Figure 9 is a side view taken on line 9—9 of Figure 8.

The suction box or trough 69 in Figure 7 is subdivided into three sequential separate suction compartments 80, 81, 82 (corresponding to those indicated in Figure 1 at 22, 23, 24) each suction compartment having its individual suction connection 80', 81', 82' shown in Figure 2 as well as Figure 7. The endless suction belt 67, is shown to have a lap joint connection 67' (see Figures 8 and 9). A sheet steel construction supported substantially by and upon the steel frame structure 34 surrounds the lower portion of the traveling chain of filter trays to provide a cake discharge hopper 83 as well as a collecting pan 84 for spent wash water from a battery of upwardly directed sprays indicated at 58 and which correspond to the sprays shown at 31 in Figure 1.

Along the side of the trays 53 along the upper tracks 56 there is shown (see Figure 5) to be provided a trough 86 having a discharge connection 87, for receiving the overflow of liquid or slurry that may have been excessively fed to the trays 53, the trays therefore being shown to have overflow spouts 87a delivering into trough 86.

There will now be described in connection with the Figures 2 to 10 that part of the apparatus or filter unit which corresponds to the spider structures $S_2$ and $S_1$ of Figure 1 with their appurtenances providing the additional operating zones which in Figure 1 have been defined as the cake discharge blow back zone $Z_5$ and the filter media drying zone $Z_8$ respectively.

But since the construction of each of these spider structures is basically the same, it will suffice to describe in detail only one of them, namely that which serves the cake discharge zone $Z_5$ at the rear end of the machine.

The spider proper of what is designated in Figure 1 collectively as spider structure $S_1$, comprises a hub portion 88 (see Figures 3 and 6) fixedly keyed to the sprocket shaft 41 between the two sprocket wheels 49 and 50 to rotate unitary therewith. From this hub portion 88 extends as many hollow spider arms 89 as are required for applying air pressure to each filter tray 53 passing over the sprocket wheels 49 and 50. In the present instance the spider comprises seven identical such spider arms 89 one of which will now be described as to the details shown in Figure 6. The spider arm comprises a hollow tubular portion 90 of a length $t_1$ extending radially from the hub portion 88 and provided at its outer end with a flange or ears 91. A mouth portion 92 is telescopically movable within the outer end of tubular portion 90, and is provided with a flange or ears 93 corresponding to ears 91 on tubular portion 90. A pair of stay bolts 94 and 95 are fixedly anchored in respective ears 91 as is indicated by a pair of lock nuts 96 and 97 for each stay bolt, which stay bolts are relatively slidable in the ears 93 to an extent determined by an adjustable stop means provided at the upper end of each stay bolt, such stop means being indicated as by a pair of nuts 98 and 99 locked against each other.

The slidable mouth piece 92 per se comprises a relatively wide cylindrical body portion $92^a$, a conical outer end portion $92^b$ extending outwardly from the body portion $92^a$, and a reduced or relatively narrow tubular neck portion $92^c$ defined against the body portion by a shoulder $92^d$. The conical outer end portion $92^b$ is formed at its outer or narrow end with a flange $92^e$ adapted to have pressure contact with the suction belt 67 here indicated in dot-and-dash lines together with the dot-and-dash indication of the bottom portion of tray 53. Within and concentric with the tubular portion 90 is provided a shorter tubular portion $93^a$ rigidly extending from the hub portion 88. To the outer end of this shorter tubular portion $93^a$ is welded an annular end portion $94^a$ providing a shoulder $94^b$ and a short cylindrical portion $94^c$, thus providing a seat for a compression coil spring $95^a$ confined between the shoulders $94^b$ and $92^d$.

A flexible tube or hose member $96^a$ for conducting pressure air to the mouth piece 92 has a suitable air tight connection with the reduced neck portion $92^c$ of the mouth piece as is indicated by a hose clamp $97^a$; this hose member $96^a$ extends from within the coil spring $95^a$ and through the annular end portion $94^a$ as well as part way through the short tubular portion $93^a$ and then out through openings $98^a$ and $99^a$ respectively provided in the tubular portions 90 and $93^a$ respectively, then, passing out from within the spider arm, constitutes a horizontal portion the outer end of which connects with a length of tube 100, the connection there being indicated as by a hose clamp $100^a$. The horizontal tube 100 is part of a rotary valve construction V which comprises as main component parts a stationary section and a rotary section, indicated as at $E_1$ and $E_2$ respectively, the rotary section being unitary with the spider shaft 41 to rotate therewith, while the stationary section is held against rotation by being braced relative to the frame 34 of the machine.

Thus, the air supply hose member $96^a$ comprises an outer stationary end portion $96^b$ within the spider arm 89, a bend $96^c$ extending from within to outside of the spider arm, and a horizontally extending inner end portion $96^d$ extending from the bed to the rotary control valve V.

The rotary section $E_2$ of the control valve V comprises a flange member 101 fixed upon sprocket shaft 41 as is indicated by a key connection 102 and by a set screw 103. Threaded or rolled into this flange member 101 is a nest of circularly disposed horizontal tubes 100 furnishing the connection with the respective hose members $96^a$ which lead into the respective spider arms 89. Fastened to the outer vertical face of the flange member 101 is a face plate 104 having holes 105 registering with the tubes 100 and held firmly in place as by studs 106 with nuts 107. The stationary section $E_1$ of the valve V comprises an annular flange-like housing member 108 having a hub portion 109 provided with a bearing liner or sleeve 110 in which rotates the sprocket shaft 41, and a flange-like body portion 111 having face to face pressure contact with the rotary face plate 104. The housing member 108 is spring-urged in an axial direction against the rotary face plate 104 as by a compression coil spring 112 while held against rotation by a cylindrical shell 113 surrounding the hub portion 109 as well as the coil spring 112. The coil spring 112 is confined between the hub portion 109 and an annular seating member 114 having between it and the frame 34 a spacer 115. The cylindrical shell 113 has its outer end fixed to the frame 34 as by angular connections 116 while its inner end fitting over the hub portion 109 is provided with longitudinally extending slots 117 through which extend studs 118 threaded into the hub portion 109 and serving to allow for a slight degree of axial displacement of the stationary housing member $E_1$ while at the same time holding it against rotation. The housing member $E_2$ has provided in its vertical face an annular groove 119 facing the holes 105 in the rotary face plate 104. A pair of arcuate filler pieces 120 and $120^a$ is fitted into the groove 119 flush with the vertical face of valve portion $E_1$ and so placed and held in place as by set screws $120^b$, that there is left as part of the groove 119 an arcuate air pressure supply chamber 121 having an air pressure connection 123. The setting of the filler pieces 120 and $120^a$ is such as to correspond to angle $W^1$ (see Figure 1) whereby the inactive spider arms are blanked off against air pressure supply, whereas the arcuate length of the air pressure supply chamber 121 corresponds to angle $W^2$ (see Figure 1) whereby air pressure is supplied from connection 123 to the active spider arms 89 which have made operating contact with the bottoms of respective filter trays 53, by means of their spring urged mouth pieces 92. A connection for supplying lubricating oil to the interface between the valve sections $E_1$ and $E_2$ is shown at O.

*Operation*

When motor M (see Figure 3) through reduction gear unit 59 and gears 60 and 61 rotates the horizontal shaft 41 it thereby rotates the pair of sprockets 49 and 50 together with the spider arms 89 which are part of the spider construction $S_2$ diagrammatically indicated in Figure 1. These sprockets engaging the rakes 54 at the bottom of the filter trays 53 move the chain of filter trays through its endless path and thus through the successive operating zones Z, $Z_1$, $Z_2$, $Z_3$, $Z_4$, $Z_5$, $Z_6$, $Z_7$, $Z_8$, $Z_9$ indicated in the diagrammatic view of Figure 1.

The movement of the train of filter trays in turn rotates a pair of sprockets 51 and 52 at the front-end of the machine and thereby rotates the shaft 44 and with it a set of spider arms which are similar to the spider arms 89, and constitute the spider construction $S_1$ diagrammatically shown in Figure 1.

With the two spider constructions $S_1$ and $S_2$ thus rotating, the outer open ends of the respective hollow spider arms successively engage in operative contact with the suction belt 67 travelling with the filter trays.

In this way, the mouth piece 92 (see Figure 6) of each spider arm comes into pressure contact with the suction belt in terminal relationship therewith namely such that each mouth piece 92 gets to register with a suction opening 13 in the bottom of a respective filter tray.

Pressure contact between the mouth piece 92 and the suction belt is effected as and when the mouth piece engages the belt whereby the mouth piece is moved or forced telescopically slightly into the tubular portion 99 of the spider arm against the pressure of compression spring 95$^a$. This telescoping motion of the mouth piece in the tubular portion 99 is absorbed because of the flexibility of the hose member 96$^a$.

Figure 6:
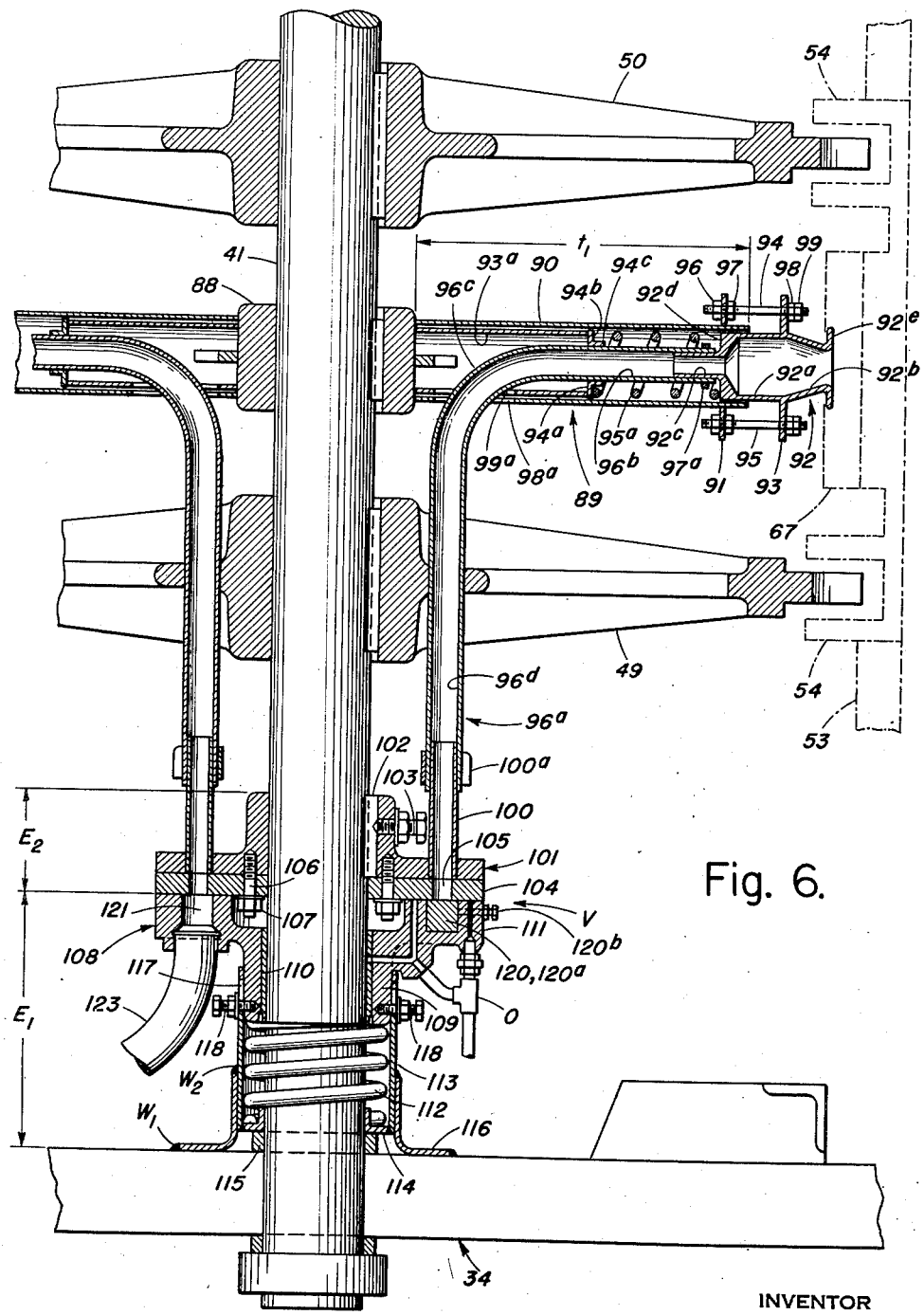
Figure 6 is an enlarged sectional detail view of the spider construction with its rotary air pressure control valve, such spider construction being diagrammatically indicated in Figure 1.

With the shaft 41 rotates the rotary section 101 of the rotary type valve V shown in Figures 6 and 11, while the section 111 of this valve remains stationary.

As a filter tray containing washed and dry filter cake leaves the suction zone Z to enter into and pass through the next following zone $Z_4$, the suction belt 67 operatively engages the corresponding spider arm in such timed relationship that the mouth piece 92 of that arm registers with a corresponding bottom opening of the filter tray, during which period (zone $Z_4$) the inner open end 105 (see Figure 11) of the spider is in effect blanked off inasmuch as it moves within an arc the length of which is defined by the filler pieces 120 and 120$^a$ (see Figure 11) having the arcuate valve chamber 119 between them.

Then, as the filter tray advances descendingly into and through the next following zone $Z_5$ the inner open end 105 of the then associated spider arm enters into and passes through an arc the length of which is that of the arcuate valve chamber 121 where the opening 105 is exposed to pressure air supplied from the supply connection 123 to chamber 121. Thus, during the passage of the filter tray through zone $Z_5$ air pressure is applied to the underside of the filter medium 12 of the filter tray, whereby the filter medium is made to bulge outwardly, this bulging together with the pressure air forced through the medium being effective to expedite the discharge of the filter cake C into the receiving hopper $H_1$.

Following this cake discharge within zone $Z_5$ the filter trays pass into the next following zone $Z_6$ where the air supplying spider arm detaches itself from the suction belt 67 after the inner end opening 105 of the arm in valve section 101 has passed out of the range of the air supply chamber 121, to be once more blanked off as it enters the arcuate range defined by the filler pieces 120 and 120$^a$ with the valve chamber 121 between them.

The filter tray leaving the neutral zone $Z_6$ in inverted position passes into the zone $Z_7$ where the filter medium is given a final cleansing by means of the upwardly directed washing sprays 31 (see Figure 1) or the sprays 58 (see Figure 2). Thence, the filter tray passes ascendingly into and through the next following zone $Z_8$ to operatively engage a spider arm 15 (see Figure 1) by way of its mouth piece 92 (see Figure 6) engaging the suction belt 67, the filter tray thus receiving pressure air at the underside of the filter medium for expelling therefrom and from the filter tray residual spray washing liquid, so that a relatively dry and yet thoroughly cleansed filter medium may present itself when the dry tray enters the next following neutral zone $Z_9$ where the respective spider arm disengages itself from the suction belt. Thereafter, the filter tray enters the suction zone Z at the beginning of which a charge of feed pulp F is supplied to the filter tray which has substantially no residual and potentially diluting wash water left in it thanks to the functioning of the pressure air previously applied in zone $Z_8$. Within the suction zone Z as defined by the length of the suction box B the filter tray is first subjected to filtration during a length $L_1$ of travel (zone $Z_1$), then to washing of the filter cake during a length $L_2$ of travel (zone $Z_2$) and to drying of the filter cake during the next following length $L_3$ of such travel (zone $Z_3$).

In the case of manufacturing phosphoric acid by way of having phosphate rock digested with sulphuric acid, when the resulting phosphoric acid slurry is fed to the filter unit herein described, there can be maintained a desired high concentration of the phosphoric acid filtrate obtainable from zone $Z_1$, insofar as dilution of the acid with residual spray wash water is avoided in accordance with this invention. That is to say, such wash water as is applied by the upwardly directed sprays 31 to the filter medium, is removed or blown from the trays within the auxiliary zone $Z_8$ at the front- or feed-end of the machine while the discharge of dry filter cake as obtained from zone $Z_3$ is expedited by the air pressure applied within the auxiliary zone $Z_5$ at the rear or cake discharge end of the machine.

Figure 10:
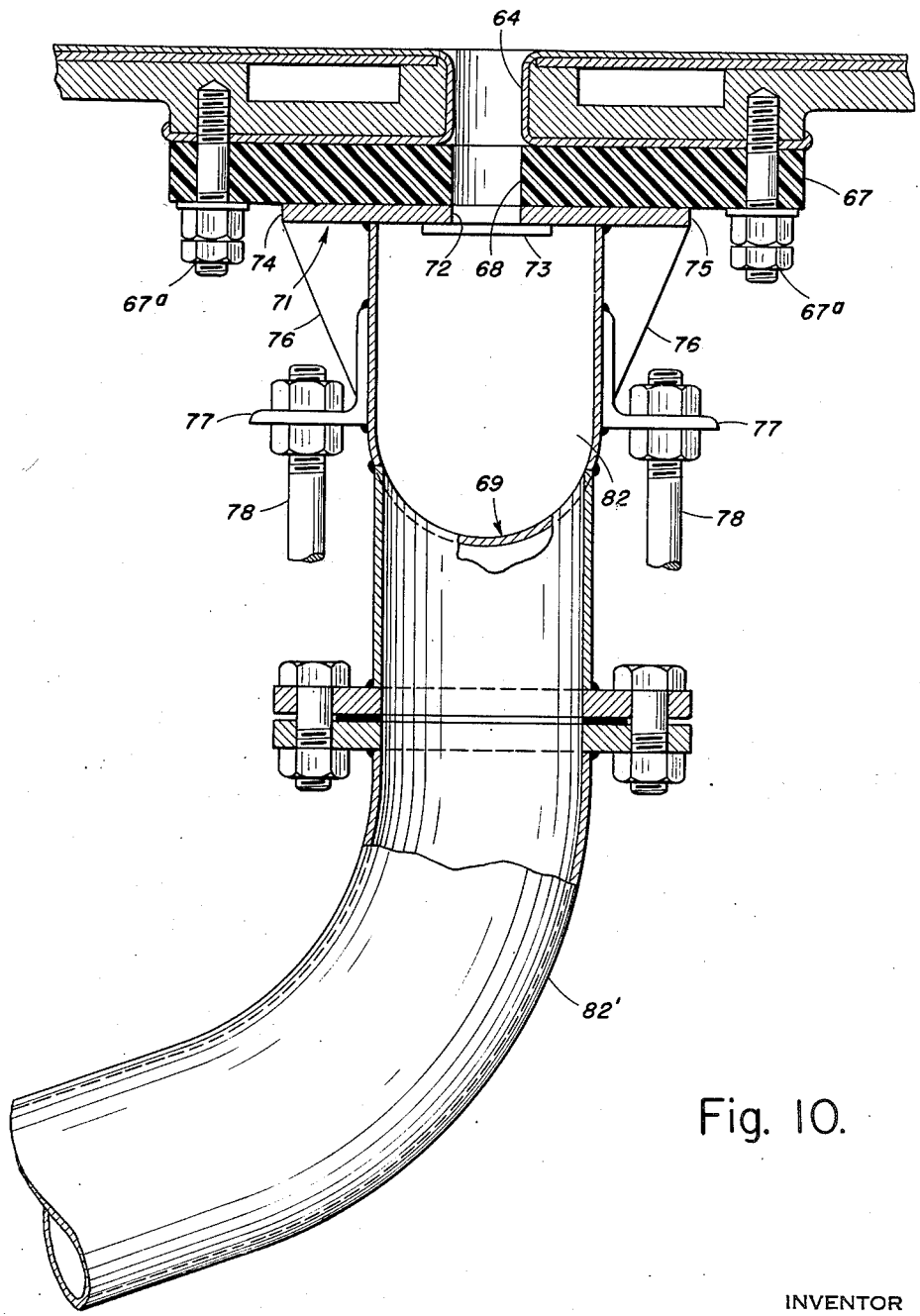
Figure 10 is a greatly enlarged cross sectional view of the suction box and suction belt taken on line 10—10 of Figure 9.

The effective extent of the auxiliary treatment zones $Z_5$ and $Z_8$ (Figure 1) at the respective ends of this machine is adjustable by way of adjustably setting the filler pieces 120 and 120$^a$ within the stationary valve section 111, the possibility of such adjustment being indicated by the set screw 120$^b$ (see Figure 10).

I claim:

1. A traveling tray belt filter unit in which an endless succession of filter trays in effect constituting an endless chain moves in a horizontally elongated endless path disposed in a vertical plane, which path comprises an upper horizontal portion where the trays in upright position are being subjected to suction filtration, a descending arcuate rear-end portion where the trays move from upright to inverted position, a lower horizontal portion where the trays move in inverted position, and a front-end ascending portion where the trays revert from inverted to upright position, means for supplying feed pulp to the trays entering said horizontal portion of their path, a suction belt coextensive with said path and associated with the bottom side of said trays to travel simultaneously therewith and having suction openings communicating with the tray bottoms, a normally stationary elongated suction box associated and coextensive with the upper horizontal portion of the suction belt, the effective length of the suction box defining the extent of a horizontal suction zone through which the trays must pass, receptacle means for receiving filter cake discharging from the trays in the descending portion of said path, and collecting means for receiving spent spray wash liquid; characterized thereby that the suction belt is fastened to the bottom side of the trays so that the suction openings in said belt are unitary with respective tray bottoms, that a pair of sprocket constructions each including a horizontal sprocket shaft for motivating said chain of trays is provided each of which comprises at least one sprocket defining by its diameter the arcuate ascending and descending portions respectively of said endless path, a spider construction substantially embodied in at least one of said sprocket constructions and comprising a set of spider arms extending from said shaft in a plane parallel to the associated sprocket and having an axis of rotation coaxial therewith, said arms being adapted to supply pressure air therethrough while rotating unitary with the associated sprocket, each of which spider arms has an outer end mouth portion adapted to enter into and to have pressure contact with the suction belt while the belt passes through one of the arcuate portions of its endless path to then establish air supply connection with the suction openings for respective trays, individual air supply conduits mounted on said sprocket structure and adapted to supply pressure air to each of said spider arms, and control valve means operatively connected with said conduits and adapted to supply air pressure selectively to the spider arms at the time of their having pressure contact with said suction belt incident to the rotation of said sprockets and the concurrent movement of the trays along the arcuate portion of their path.

2. A traveling tray belt filter unit according to claim 1, in which each spider arm comprises a hollow tubular portion, a separate filter mouth portion telescopically movable in the outer end of said tubular portion, resilient means for urging said mouth portion outwardly whereby the mouth portion is adapted to assume pressure contact with said suction belt, stop means defining the extreme outer portion of the mouth portion; and in which said conduits comprise flexible tubular connections adapted to be flexed incident to telescopic movement of said mouth portions.

3. A traveling tray belt filter unit according to claim 1, in which said control valve comprises a rotary flange-like section fixed upon said sprocket shaft to rotate therewith and having circularly disposed ports constituting the outer terminals of said conduits, a non-rotatable companion section having face to face pressure bearing relationship with said rotary section and also having rotary bearing relationship with said shaft, resilient means associated with and acting upon said companion section for maintaining said face to face contact therewith, said companion section comprising an air supply chamber in the form of a recess facing said ports of the rotary section to supply air pressure consecutively thereto as the rotary section rotates relative to the non-rotatable section incident to the operation of the filter unit, said recess being so disposed and dimensioned in its phase relationship with respect to the rotary section that pressure air therefrom is supplied to the traveling trays during an arcuate portion of their endless path, and pressure supply means for said chamber.

4. A traveling tray belt filter unit according to claim 3, in which said non-rotatable valve section has an annular groove facing the ports of the rotary section, with the addition of an arcuate filler piece constituting an interrupted annulus fitted into said groove so that said recess is defined by that portion of the groove not occupied by said filler piece, said filler piece being adjustable along said groove for varying the location of said recess therein.

5. A traveling tray belt filter unit according to claim 1, in which said sprocket construction comprises a pair of sprocket wheels, and in which said suction belt and said spider arms are disposed between said sprocket wheels.

6. A traveling tray belt filter unit according to claim 1, in which any two trays adjoining one another are interconnected by a link so that each tray constitutes a link member, having an effective length equal to that of the interconnecting links with the pitch of the sprocket teeth corresponding to the length of said links; and in which the number of spider arms is equal to that of the sprocket teeth, and each spider arm is associated and coextensive with a corresponding sprocket tooth.

7. A traveling tray belt filter unit according to claim 1 in which said spider construction is disposed at the feed end of the unit, with the addition of spray washing means disposed underneath the lower horizontal portion of said endless chain for directing washing sprays upwardly for spray washing the filter media of the trays when in inverted position.

References Cited in the file of this patent

UNITED STATES PATENTS

| Number | Name | Date |
|---|---|---|
| 1,967,310 | Kent | July 24, 1934 |
| 2,570,697 | Nordengren | Oct. 9, 1951 |

FOREIGN PATENTS

| Number | Country | Date |
|---|---|---|
| 502,672 | Germany | July 16, 1930 |
| 570,501 | Great Britain | July 10, 1945 |